United States Patent [19]
Obadal et al.

[11] 3,889,717
[45] June 17, 1975

[54] REINFORCED FLEXIBLE TUBE

[75] Inventors: Richard Dick Obadal, Cedar Falls; William David Loynachan, Reinbeck, both of Iowa

[73] Assignee: Deere & Company, Moline, Ill.

[22] Filed: Dec. 14, 1973

[21] Appl. No.: 424,865

[52] U.S. Cl. ............... 138/131; 138/110; 138/178
[51] Int. Cl. ...................... F16l 11/00; F16l 11/10
[58] Field of Search ........... 138/108, 110, 131, 178; 15/104.2

[56] References Cited
UNITED STATES PATENTS

| | | | |
|---|---|---|---|
| 644,794 | 3/1900 | Cummings | 15/104.2 |
| 3,498,335 | 3/1970 | Cook | 138/178 |
| 3,610,289 | 10/1971 | Moss | 138/131 X R |

*Primary Examiner*—Henry K. Artis
*Assistant Examiner*—James E. Bryant, III

[57] ABSTRACT

A flexible tube such as is used in the coolant system of an internal combustion engine is reinforced against radially inward collapse as, for example, by vacuum created in the system, the reinforcement taking the form of a helical member stiffer than the tube and freely disposed within the tube and provided itself with a lengthwise anti-compression element that prevents lengthwise migration of the helical member within the tube.

7 Claims, 2 Drawing Figures

REINFORCED FLEXIBLE TUBE

BACKGROUND OF THE INVENTION

Rubber and like flexible tubes, reinforced by internal metallic or the like coils or helices, have been known for quite some time, the principal type of which is that in which the metal coil is molded or embedded in the wall of the tube. This construction is satisfactory from the standpoint of providing a tube having long life but has the disadvantage of being expensive. Attempts have been made at placing wire coils or helices freely within the tubes, but in each case the coil has a tendency to migrate lengthwise within the tube and thus leaves a substantial portion of the tube without support or reinforcement and as a result that portion of the tube collapses when vacuum is created in the system. Various other means for preventing coil migration have been unsuccessful because reliance has been placed on changes in tube configuration, cross-section, etc.

SUMMARY OF THE INVENTION

According to the present invention, a simple, inexpensive tube combination has been devised in which a helical member stiffer than the tube is freely disposed within the tube without in any way altering the basic construction of the tube. To prevent lengthwise migration of the coil or helix within the tube, an element runs lengthwise of the member within the tube and is attached at lengthwise intervals to the member. The element is relatively resistant to lengthwise compression and thus keeps the attached coils spaced apart and prevents creeping of portions of the member relative to other of its portions.

The member and element are capable of being provided as a unit for installation in conventional tubes, whether the tubes be straight or curved and, since the member and element are selfcontained and not molded into or otherwise embedded in the tube, the member-element unit may be freely inserted into or withdrawn from any conventional tube.

DESCRIPTION OF THE PREFERRED EMBODIMENT

Figure 1:
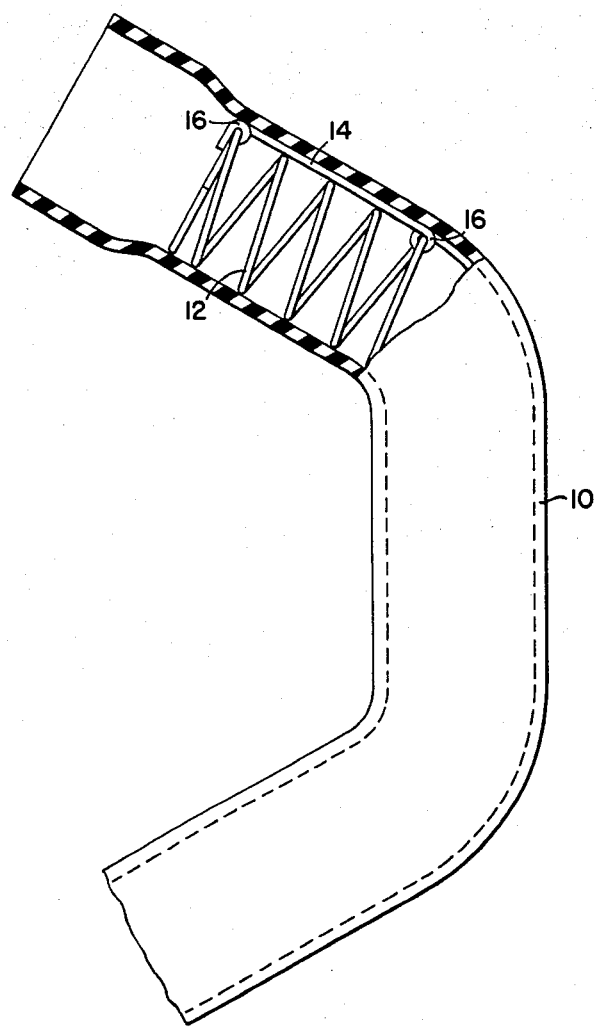
FIG. 1 is an elevation, with a portion broken away and shown in section, of a typical flexible tube in which a member-element unit is installed.
Figure 2:
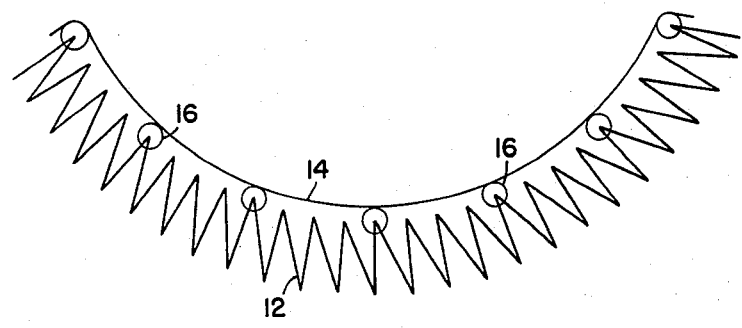
FIG. 2 is a somewhat schematic view of the member-element unit, showing a preferred assembly apart from the tube.

In FIG. 1, the numeral 10 indicates a conventional flexible tube of usual design and construction, being formed of rubber or rubber-like materials of any character. One area in which tubes of this nature find practical utility is the cooling systems of internal combustion engines, as, for example, the connection between the water pump and radiator. The obvious advantages of flexible connections over rigid connections is that the former are less costly, lend themselves to easy configuration, adapt readily to relative movement between the engine and radiator, etc. One disadvantage is that an unreinforced tube will collapse radially inwardly when a vacuum is created in the system.

As stated above, this disadvantage has been obviated in the past by constructing the tube as one in which a helical or coiled metal or the like reinforcement is molded or otherwise embedded in the tube wall. The coil is inherently flexible so as to accomodate the aforesaid characteristics of the flexible tube; e.g., curvature, relative movement between the engine and radiator, etc., but the cost rises as these advantages accrue.

One attempted solution to the cost-adequacy problem has been to place a metal or other rigid helix or coil freely within the tube, but this gives rise to another problem; i.e., fluid flow through the tube causes the coil to creep or migrate in the direction of fluid flow, leaving enough of the tube in an unreinforced state subject to collapse and block the system.

A reinforcing helical or coil member is shown here at 12, being of metal or other material relatively more rigid than the material of the tube 10 so as to prevent or minimize radially inward collapse of the tube. This coil is in no way embedded, molded, etc. into the tube; i.e., the tube 10 may be of simple, ordinary construction and the member 12, considered by itself, may be readily inserted into or withdrawn from the tube. Preferably the member 12 runs substantially coextensively in length with the tube 10.

To prevent migration or "axial compression" of the coil or member 12 within the tube 10, the present invention provides an elongated element 14 of material that is relatively resistant to compression. In a preferred embodiment, both the coil 12 and element 14 may be of typical metallic spring or like wire; although, other materials, sections, etc. may be employed. The element 14 is attached at lengthwise intervals to the helical member 12, preferably by the provision on the element of integral loops 16; i.e., the formation of the element is such that the element starts as a straight wire or the like, is formed with a first loop, continues as a straight portion and successively repeats loops and straight portions. It has been found that the spacing of the loops 16 should be about every fourth coil or convolution of the member 14; although, of course, this will vary according to tube sizes, rates of flow, pressures, etc.

In normal installation of the assembled reinforced tube in a system, the female ends of the tube will receive male connections into which the member-element unit 14–16 cannot enter; i.e., one end, at least, of the unit will abut the proximate male connection. This will anchor that one end, especially the downstream end as respects the direction of fluid flow. Since the element 14 acts through the loops or attachment portions 16 to maintain the length of the member 14, the member cannot shorten and thus cannot creep or migrate within the tube. Consequently, the tube retains its reinforced status throughout its length and cannot collapse.

We claim:

1. A tube of flexible material and a helical member disposed lengthwise within the tube and of material stiffer than the tube so as to reinforce the tube against radially inward collapse, characterized in that the member is freely disposed within the tube so as to be capable of being readily inserted into and withdrawn from the tube, and an elongated element relatively resistant to lengthwise compression and disposed within the tube and running lengthwise of the tube and member and attached to the member at lengthwise spaced-apart intervals to minimize axial migration of the member within and relative to the tube.

2. The invention defined in claim 1, further characterized in that the element is attached solely to the member so as to form with the member a unit readily insertable into and withdrawable from the tube.

3. The invention defined in claim 2, further characterized in that the element has a plurality of loops formed integrally with the element and spaced lengthwise thereof and engaging complementarily spaced coils of the member.

4. The invention defined in claim 1, in which the tube has a curved portion and the member and element have adequate flexibility to accomodate said curved portion.

5. For use with a flexible tube as means to reinforce the tube against radially inward collapse: an elongated helical member stiffer than the tube and adapted to be freely disposed lengthwise within the tube, and an elongated element relatively resistant to compression and running lengthwise of the member and attached to the member at lengthwise intervals to minimize shortening of the member.

6. The invention defined in claim 5, in which the element has a plurality of loops formed integrally with the element and spaced apart lengthwise thereof and engaging complimentarily spaced coils of the member.

7. The invention defined in claim 6, in which the member and element have adequate flexibility to accomodate installation in a curved tube.

* * * * *